UNITED STATES PATENT OFFICE.

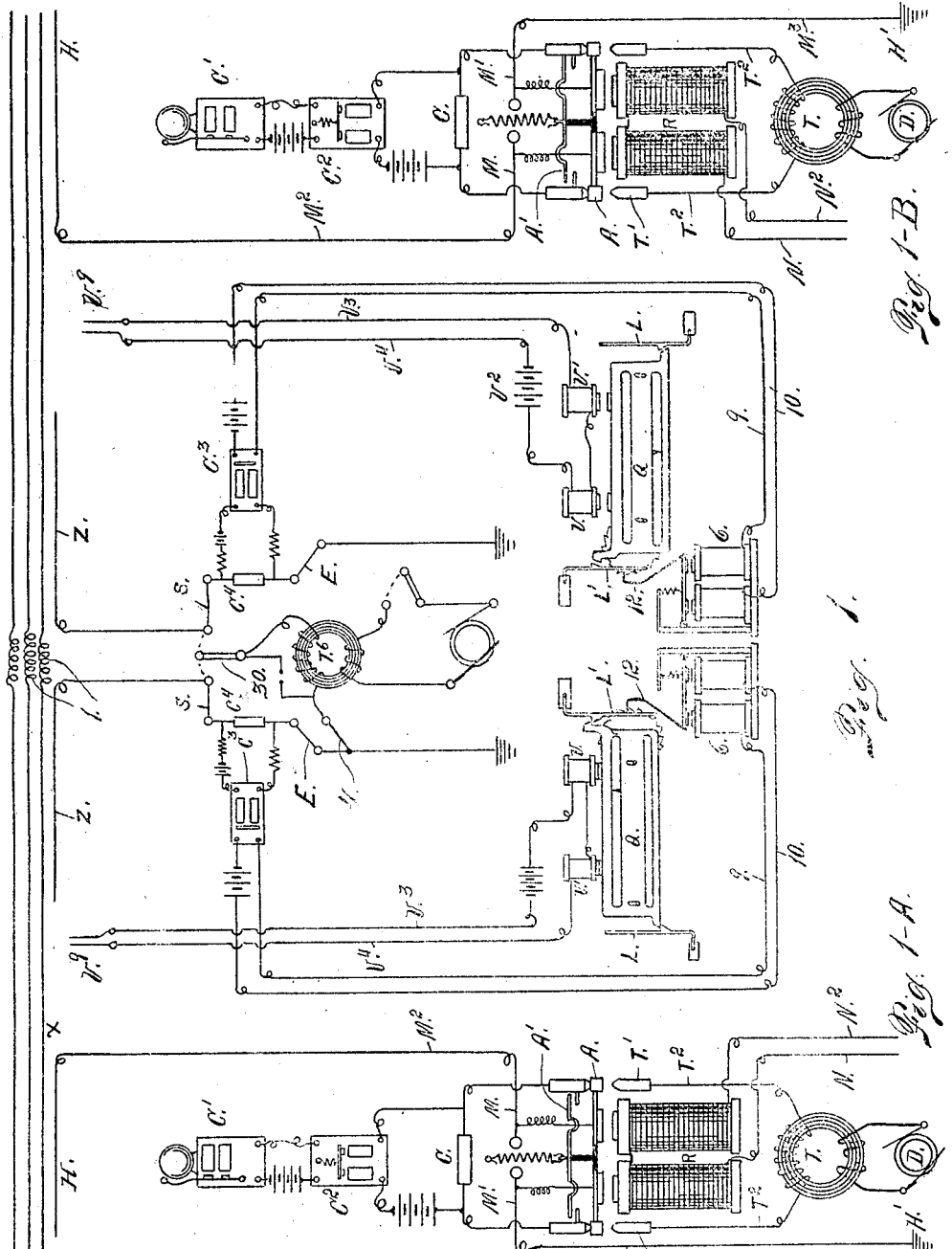

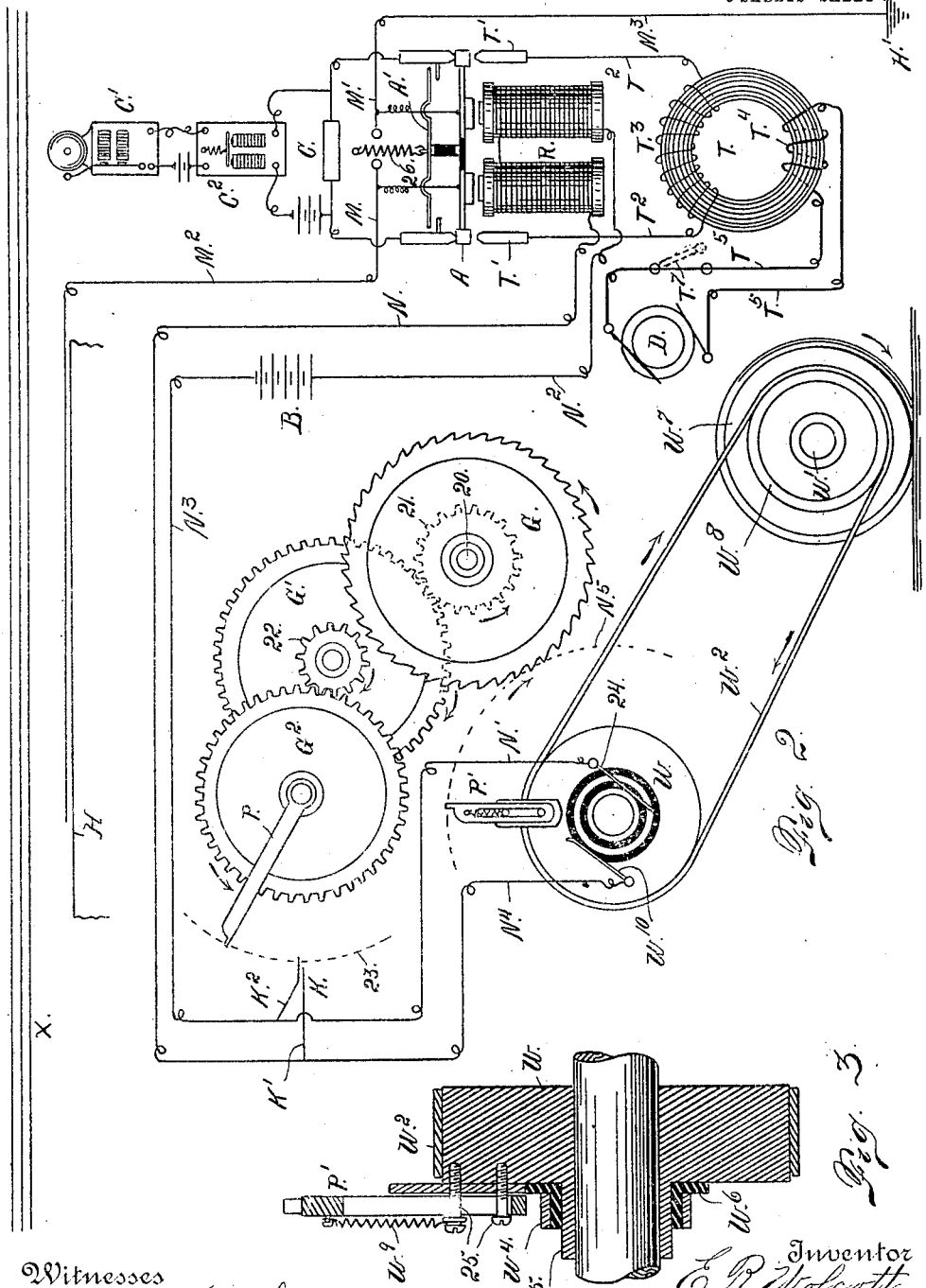

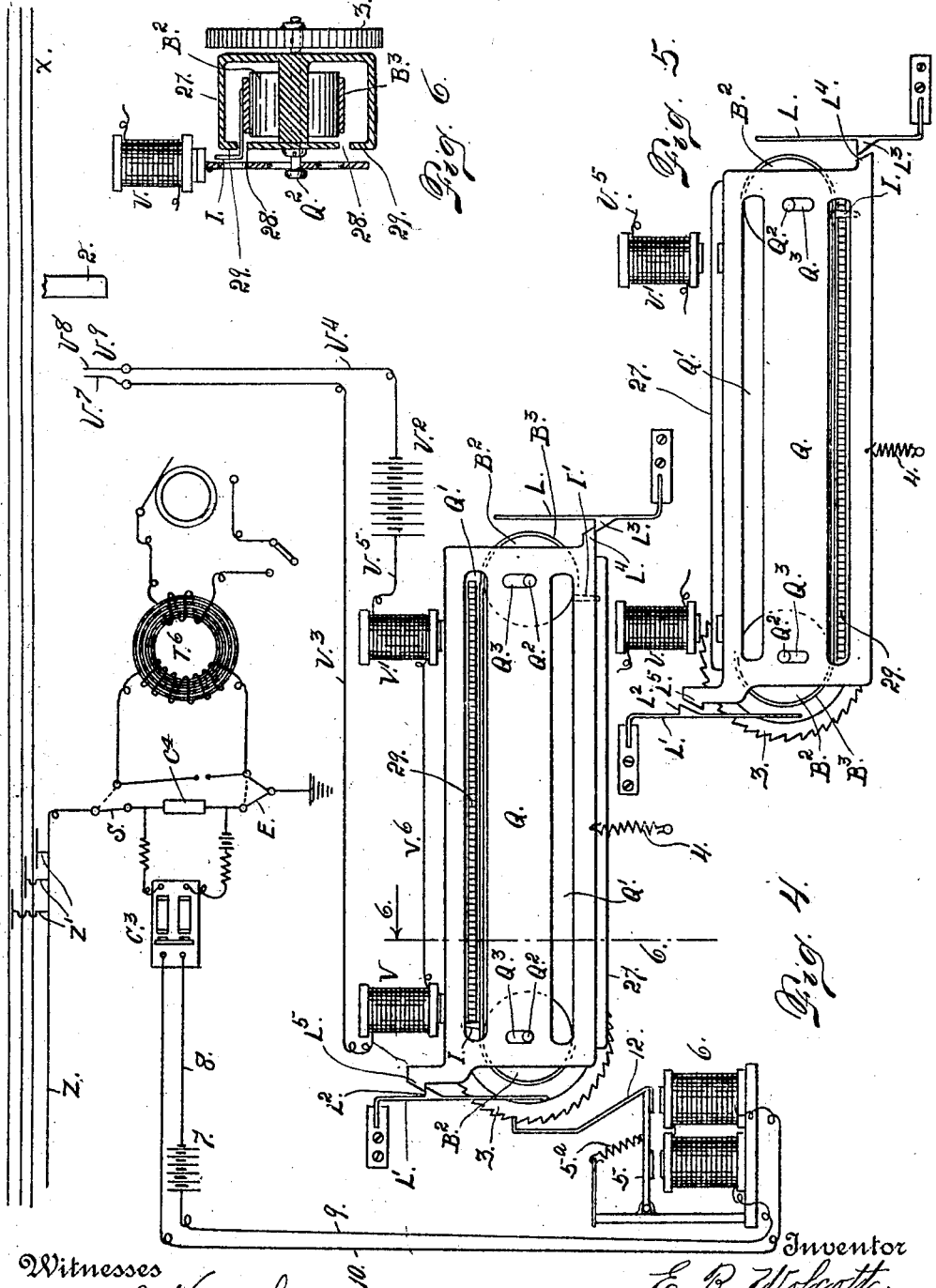

EDSON RAY WOLCOTT, OF GOLDEN, COLORADO.

RAILWAY SIGNALING APPARATUS.

No. 852,405.  Specification of Letters Patent.  Patented April 30, 1907.

Application filed December 27, 1904. Serial No. 238,295.

To all whom it may concern:

Be it known that I, EDSON RAY WOLCOTT, a citizen of the United States, residing at Golden, in the county of Jefferson and State of Colorado, have invented certain new and useful Improvements in Railway Signaling Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to railway signaling apparatus whereby electrical impulses are transmitted between stations and trains by induction. The trains and stations are also equipped with means for receiving as well as transmitting these impulses. Each station is also equipped with an indicating apparatus whereby the location of trains both going and coming may be accurately located, the indicating mechanism being operated by the inductive impulses. Ordinary telegraph wires may be employed for transmitting and receiving these impulses, the said wires receiving and transmitting the impulses by induction to and from the roofs of the cars with which the transmitting and receiving apparatus mounted on the train is connected. Each train is equipped with apparatus for automatically closing the transmission circuit at predetermined intervals. By means of suitable gearing this apparatus may be made to operate whenever the train has traveled a certain distance as a mile for instance. Every time a pulsation is transmitted to the indicating mechanism at the station, the tape or other indicating device is actuated a certain distance. By reason of this construction and arrangement every transmitted pulsation denotes a predetermined distance of the trains' travel. Hence it becomes practicable as before stated, by means of the inductive electrical transmission and receiving apparatus mounted on the trains and the receiving apparatus located at the station, for the agent at the station to know the location or distance of trains from the station at all times.

It is preferred to have two indicators located at each station, one of which indicates the location of trains going and coming on one side of the station while the other indicator performs the same function with reference to trains going and coming on the other side of the station.

The broad idea of transmitting impulses by induction between trains and between trains and stations, is not new since an apparatus of this character is disclosed in United States patents numbered 350,235 and 350,234, respectively. My improvements, however, are believed to utilize this principle in a thoroughly practicable way for automatically transmitting and receiving signals between trains and between trains and stations in the manner hereinbefore briefly outlined in a very general way.

The invention will now be described in detail reference being made to the accompanying drawing in which, Figure 1 illustrates the apparatus at a station. Fig. 1$^A$ shows the transmission and receiving apparatus on one train and Fig. 1$^B$ the corresponding apparatus on the other train, the two trains being on opposite sides of the station. Fig. 2 shows the entire train equipment, showing not only the apparatus for transmitting and receiving the electrical impulses, but also the apparatus for automatically closing the transmission circuit at predetermined intervals. Fig. 3 is a sectional detail view shown on a larger scale illustrating a portion of the circuit-closing mechanism. Fig. 4 shows one of the station indicators on a larger scale, together with the other apparatus connected therewith. Fig. 5 is a similar view of an indicator with its movable casing shown in a different position. Fig. 6 is a section taken on the line 6—6 Fig. 4 viewed in the direction of the arrow.

The same reference characters indicate the same parts in all the views.

Let M designate a terminal of a conductor M$^2$ the latter being connected with the roof H of a car or an insulated conductor mounted on the latter. The roof of the car is indicated in a conventional way only. It is, however, assumed that the apparatus shown in Fig. 2, and also in Figs. 1$^A$ and 1$^B$, is mounted upon the car, a portion of whose roof is designated H in Fig. 2. It must be understood that in the drawings, the illustration is almost entirely of a diagrammatic nature. The terminal M' is connected with the ground as indicated at H', through the medium of an element or elements designated M$^3$ in the drawing. In practice this element M³ will consist of metallic parts whereby the current is carried to the track through the medium of the car wheels, or other suitable apparatus.

R is an electro magnet. From one terminal of the coils of this magnet a conductor N leads to a contact K'; while from the other coil terminal a conductor N² leads to one pole of a battery or other electrical source B. From the other pole of this battery leads a conductor N³ to a contact K². The two contacts K' and K² are arranged in such proximity to each other as to form what may be termed a key K. As one of these contacts, namely K² is actuated, it is brought into engagement with the contact K', thus closing the circuit in which the battery B is located, and energizing the magnet R. The magnet then actuates the spring-held bar A whereby the latter is made to engage the terminals T' connected with the secondary coils T³ of a transformer or induction coil T by conductors T², thus closing the transmission circuit and placing the apparatus in condition to transmit impulses by induction from the conductor M² and the car roof H, to the telegraph or other wires X. These electrical impulses are taken by induction from the wires X and transmitted to the receiving apparatus of another car or the indicating mechanism at a station or both, according to circumstances, as will be hereinafter explained.

The primary coils T⁴ of the transformer are supplied from a dynamo, battery or other electrical source D through the instrumentality of conductors T⁵. This primary circuit is provided with a movable element T⁷ for breaking the transmission circuit either permanently for the purpose of receiving signals through the receiving mechanism, or intermittently for the purpose of transmitting impulses when the transmission circuit would otherwise be continuously closed.

When the key K is not closed, the terminals M and M' are connected to the receiver of the electrical impulses as a telephone, coherer or the like, on the train, the same being designated C in the drawing, whereby a danger signal as a bell C' is operated through the instrumentality of a relay C².

The manner of automatically closing the transmission circuit at predetermined intervals will now be described.

Referring to Fig. 2, W' may indicate the axle of a car wheel W⁷. A wheel W⁸ may also be fast on this axle and connected by means of a belt W² with a wheel W also mounted on the car and carrying an arm P' occupying a radial position on the wheel. A spring W⁹ is connected with this arm, and this spring has a tendency to draw the arm inwardly to engagement with a collar W⁴ which is engaged by a metal brush W¹⁰ with which is connected a conductor N⁴ which is merely a continuation of the conductor N, since the latter may be said to terminate at the contact K'. When the train is in motion, the arm P' is thrown to its outward limit of movement by centrifugal force, whereby it travels in a circle indicated by the dotted line N⁵. A ratchet wheel G has its toothed periphery so located, that the arm P' when at its outward limit of movement, engages the ratchet wheel and gives it a partial rotation, every time the wheel W makes a rotation. Mounted on the axle 20 of the ratchet wheel G, is a gear 21 meshing with a larger gear G' upon whose axle is made fast a smaller gear 22 which meshes with the larger gear G² to the axle of which is secured an arm P whose outer extremity moves in a circle indicated by the dotted line 23. The length of this arm P is such that it engages the contact K² and causes it to engage the contact K', thus closing the key K and closing the transmission circuit in the manner heretofore explained. It will thus be observed that the movement caused by the engagement of the arm P' with the ratchet wheel G, is transmitted through the medium of speed-reducing gearing, to the arm P, thus making it practicable to close the transmission circuit at any desired predetermined intervals. It is therefore evident that the periods between the circuit closing acts of the arm P, may be so regulated that the circuit may be closed every time the train has traveled a predetermined distance. Hence every pulsation transmitted from one train to another train or to a station, will mean that the train has traveled a given distance since the pulsation immediately preceding.

As before stated as soon as the train stops, the closing of the circuit through the instrumentality of the arms P and P' and the train of gears, will cease. However, as the train ceases to move, the centrifugal force normally acting on the arm P', ceases to act, and the latter will be drawn to its inward limit of movement by the spring W⁹, whereby it will engage the contact collar W⁴, this contact being separated from the body of the wheel W by insulating material W⁶. The body of the wheel W is provided with a sleeve W⁵ formed integral therewith and this sleeve is engaged by a metal brush 24 which is connected by a conductor N' with the conductor N³. The movable arm P' is connected with the body of the wheel W by screws 25, the said screws passing through a slot in the arm. The construction, however, is such that the electric current can pass freely from the arm P' to the body of the wheel W. Hence the transmission circuit is closed through the said elements when the arm P' is drawn inwardly or when the car stops. The result of this construction and arrangement is to permanently close the transmission circuit when the car stops. Now if it is desired to receive signals when the car stops, the transmission circuit will be broken by moving the arm $T^7$ to the dotted line position in Fig. 2. If, however, it is desired to transmit impulses intermittently while the car is stopped, the arm $T^7$ may be moved back and forth between the full and dotted line positions, whereby the transmission circuit is intermittently closed and broken. By reason of this construction and arrangement, the person in charge of the train may signal a station or another train as desired.

When the key K is closed and the arm A brought into contact with the secondary terminals $T'$ of T, an attachment $A'$ comes in contact with the terminals M and $M'$, thereby short-circuiting the receiving device C. To the arms A and $A'$ is attached a spring 26 which breaks the contact between A and the terminals $T'$ and between $A'$ with the terminals M and $M'$ when the key K is not closed.

The manner of receiving electrical impulses at stations, whereby the indicating mechanism is actuated will now be described.

Referring now more especially to Fig. 4, the signals are received by wires Z running parallel with the telegraph wires or by condensers arranged as shown at $Z'$. At each station there will be a separate wire Z running from the station in both directions, whereby separate indicators may be had for the trains on both sides of the station. By reference to Fig. 4, the wire running to one side only will be considered. S is the receiving terminal of this wire and E the earth terminal. These are kept connected with the receiving apparatus as a telephone receiver, coherer or the like designated $C^4$ in Fig. 4, unless it is desired to signal to a train, whereupon S and E will be connected to a transmitting apparatus $T^6$ similar to that on the train, by throwing the terminals S and E to the dotted line position in Fig. 4.

The relay $C^3$ of the receiving apparatus operates the armature 5 of an electro-magnet 6 normally held away from the magnet by a spring $5^a$. To the armature 5 is connected a spring hook or clutch 12 which engages the teeth of a ratchet wheel 3, whereby a partial rotation is imparted to the said wheel every time an impulse is received. This ratchet wheel is mounted on the same axle as a pulley $B^2$ which is connected with another pulley $B^2$ by an indicating band or tape $B^3$ carrying two pointers I and $I'$. The pulleys $B^2$ are suitably separated and journaled in a casing 27 provided with slots 28 through which the pointers I and $I'$ protrude. The portions of this casing designated 29, are graduated to indicate miles or any desired subdivisions thereof. The upper graduated part is disclosed in Fig. 4. The upper and lower graduated parts 29 of the casing, are alternately exposed, through longitudinal slots $Q'$ (see Fig. 6) formed in a plate Q movably mounted on the axles $Q^2$ of the pulleys. This plate is provided with slots $Q^3$ whereby it may be moved a limited distance on the said axles. The plate is mounted to be actuated by electro-magnets V and $V'$ which are connected with the poles of a battery $V^2$ by suitable conductors $V^3$, $V^4$ and $V^5$, the two magnets being connected by a conductor $V^6$. The terminals of the conductors $V^3$ and $V^4$ may be said to consist of contacts $V^7$ and $V^8$ forming a key $V^9$, so arranged that a train passing the station going in one direction engages the contacts $V^7$ and $V^8$ and closes the circuit through the magnets V and $V'$ whereby the plate Q is thrown to its limit of movement in one direction or to the position shown in Fig. 4 for instance. This plate is provided with two hook-shaped parts $L^4$ and $L^5$ adapted to engage the teeth $L^3$ and $L^2$, respectively of springs L and $L'$ respectively, whereby the plate when actuated as just explained is supported by the toothed springs in the elevated position, while the train is traveling a given distance or through what may be termed one block or subdivision of the line of track, in one direction. While the train is moving through this block or track subdivision, the pointer I will be caused to travel from the extreme right of the graduated part 29 (see Fig. 4) to the extreme left of said part, thus indicating to the station agent that the train has traveled a certain distance, the said distance being as far as it is considered desirable or necessary for the station agent to look after or watch the train so to speak through the instrumentality of my improved apparatus. So far as the principle of the apparatus is concerned, it will be understood that the distance is immaterial since it may be the entire distance between stations or a portion of that distance as may be desired. In any event after the train has traveled a predetermined distance away from the station, it may be assumed that the two pointers I and $I'$ have reached the relative position shown in Fig. 4. Now as the train continues to travel and the electrical impulses continue their action on the indicating mechanism, the belt $B^3$ will continue its movement, whereby the pointers or indicators I and $I'$ will shortly be made to engage the springs L and $L'$ whereby the said springs are forced outwardly sufficiently to disengage the plate Q from the teeth of the springs, whereby the plate is allowed to drop either by gravity or by the combined force of gravity and a spring H, or by the use of a spring altogether as may be desired, to the position shown in Fig. 5 of the drawing, whereby the lower graduated part 29 of the casing 27 will be disclosed through the slot $Q'$, while the upper graduated part will be concealed. At the time the plate Q changes its position, the pointers I and $I'$ will be at the opposite extremities of the indicating apparatus, and the train will pass out of the block whereby it no longer has any influence upon the indicating mechanism. Now as soon as a train enters the said block coming toward the station, the impulse is delivered to the indicating mechanism and will continue the operation of the belt B³ and the pointers I and I', whereby the pointer I will shortly be brought to the left hand extremity of the graduated part 29 (see Fig. 5). As soon as this pointer begins to move along this lower graduated part of the indicator, the station agent knows that a train is approaching and he is also able to locate the train with practical accuracy or in other words watch its movement by watching the indicator I. Now by the time the train has reached the station, the indicator I will have reached the right hand extremity of the indicating mechanism or approximately that position. It will thus be understood that the station agent is able to keep track of the trains so to speak while they are moving through a block in both directions on either side of the station.

In order to watch trains going and coming on both sides of the station, it is evident that two indicating devices of the construction shown in Figs. 4 and 5 will be necessary and these are indicated in Fig. 1 which shows diagrammatically a complete station equipment. The individual elements of the two sets of indicating mechanism are designated by the same reference characters, since they are practically identical in construction. The keys V⁹, however, of the two indicators, are preferably arranged to be closed by trains passing the station in opposite directions or in such a manner that a train passing the station in one direction while it closes the one key will not interfere with the other key.

In using the double construction of mechanism shown in Fig. 1, instead of moving the element S as shown in Fig. 4 to close the transmission circuit, the said circuit is closed by moving an arm 30 in the one direction or the other, according as it is desired to transmit impulses to trains on the one or the other side of the station, since in Fig. 1 the transmission device T⁶ is used for transmitting signals in both directions from the station. If two transmission devices are employed, the construction would be the same as shown in Fig. 4.

It is evident that any desired construction of receiving and indicating signals at the station may be employed. For instance the mechanism for receiving signals at the station may be substantially the same as that employed on the trains if desired.

Attention is called to the fact that instead of the belt W² and the pulleys engaged thereby, the same being illustrated in Fig. 2, any suitable mechanism may be employed for transmitting motion from a car wheel to the wheel upon which the actuating device P' is mounted.

While in the specification the transmission and receiving mechanism have sometimes been referred to as mounted on a car, it must be understood that this apparatus may be mounted on the engine or locomotive or any other suitable part of the train.

Heretofore in the specification I have referred to the short circuiting of the receiving device C. The object of this is to cut the said device C out of the circuit during the transmission of signals to prevent the operation of said device during such transmission.

In order to close the circuits for shifting the plates Q of the indicators, a device 2 (see the upper right hand part of Fig. 4) may be connected to one side of each train and so arranged, that as the train passes the station, the said device 2 will bring the contacts V⁷ and V⁸ of one indicator, into engagement thus closing the magnet circuits whereby the plate Q is shifted. By arranging the keys V⁹ of the two indicators, on opposite sides of the track and in the path of the device 2, the circuit for shifting the plate Q of one indicator, will be closed when the train is moving in one direction while the other circuit remains open, as is desired. This is believed to be a preferred arrangement.

In Fig. 1 choke coils 1 of suitable dimensions are shown in the conductors X, the same being located between the two adjacent conductors Z. The object of these choke coils is to provide a construction whereby the impulses coming from one side of the station will affect the conductor Z on that side and not the conductor Z on the opposite side.

It is to be understood that in all cases where an alternating current dynamo and transformer are shown in the drawing, a battery and an induction coil may be substituted.

Having thus described my invention, what I claim is:

1. In railway inductive signaling apparatus, the combination with one or more conductors mounted in suitable proximity to the track, of a train having an instrument operated to transmit inductive electrical impulses to said conductors, a normally open circuit in which the transmission instrument is located, means mounted on the car for automatically closing said circuit at predetermined intervals, and means located at the station and automatically operated by impulses taken inductively from the said conductors to indicate the location of trains.

2. In railway inductive signaling apparatus, the combination with one or more conductors mounted in suitable proximity to the track, of a train having an instrument operated to transmit inductive electrical impulses to said conductors, an instrument operating to receive inductive electrical impulses from said conductors, a normally closed receiving circuit, a normally open transmission circuit, and means mounted on the train for automatically and simultaneously opening the receiving circuit and closing the transmission circuit.

3. In railway induction signaling apparatus, the combination with one or more conductors mounted in suitable proximity to the track, of a car having a transmission circuit normally open when the train is in motion, means for automatically closing the circuit when the train is in motion, and means for automatically and permanently closing the circuit when the train stops.

4. In railway inductive signaling apparatus, the combination with one or more conductors mounted in suitable proximity to the track, of a train having railway signaling, transmitting and receiving instruments, a normally closed circuit in which the receiving and signaling instruments are located, the said instruments operating to transmit and receive inductive electrical impulses through the instrumentality of the said conductors, a normally closed receiving circuit and a signaling circuit, and means for automatically and simultaneously closing the transmission circuit and opening the receiving and signaling circuit at predetermined intervals.

5. In railway inductive signaling apparatus, the combination with one or more electrical conductors mounted in suitable proximity to the track, of a car or train having railway transmitting and receiving instruments, operating in connection with the said conductors to transmit and receive signals produced by inductive impulses, means mounted on the car or train for automatically and intermittently closing the transmission circuit and opening the receiving and signaling circuit, and a station having an indicating instrument for receiving the inductive impulses produced on the cars or trains going in both directions and on both sides of the station, to indicate the location of trains.

6. In railway inductive signaling apparatus, the combination with instruments mounted on the train for transmitting and receiving inductive electrical impulses, circuits in which the said instruments are located, means mounted on the train for automatically and intermittently opening and closing said circuits, alternately, and means located at the station and automatically operated by impulses taken inductively from said circuit to indicate the location of trains.

7. In railway inductive signaling apparatus, the combination of an instrument mounted on the car or train for transmitting inductive electrical impulses, a circuit in which said instrument is located, means mounted on the car or train for automatically and intermittently opening and closing said circuit, and means located at the station and automatically operated by impulses taken inductively from said circuit to indicate the location of trains.

8. In railway inductive signaling apparatus, the combination with one or more conductors mounted in suitable proximity to the track, an instrument mounted on the train for transmitting electrical impulses to the said conductors by induction, and mechanism located at stations and automatically operated by impulses taken inductively from said line conductors, to indicate the location of trains.

9. In railway inductive signaling apparatus, the combination with one or more conductors mounted in suitable proximity to the track, of an instrument mounted on the car or train for transmitting electrical impulses to the said conductors by induction, and indicating mechanism located at stations and operated by impulses taken inductively from the said line conductors, the said indicating mechanism being constructed to indicate the location or distance from the station of trains going toward and away from the station on both sides thereof.

10. In railway inductive signaling apparatus, the combination of an instrument mounted on the train for receiving inductive electrical impulses, a circuit in which said instrument is located, means mounted on the train for automatically and intermittently opening and closing said circuit, and means located at the station and automatically operated by impulses taken inductively from said circuit to indicate the location of trains.

11. In a railway inductive signaling apparatus, the combination with one or more conductors mounted in suitable proximity to the track, an instrument mounted on the train for transmitting electrical impulses to the said conductors by induction, an indicating mechanism located at stations and operated by impulses taken inductively from said line conductors, the line conductors being provided with choke coils to prevent the impulses from passing the stations where the indicating mechanism to be actuated is located.

12. In railway signaling apparatus, the combination with one or more conductors mounted in suitable proximity to the track, of an instrument mounted on the car or train for transmitting the electrical impulses to the said conductors, and indicating mechanism located at stations and operated by impulses taken from the said line conductors, the said indicating mechanism including an endless traveling band.

13. In railway signaling apparatus, the combination with one or more conductors mounted in suitable proximity to the track, of an instrument mounted on the car or train for transmitting the electrical impulses to the said conductors, and indicating mechanism located at stations and operated by impulses taken from the said line conductors, the said indicating mechanism including an endless traveling band, and pointers carried thereby for the purpose set forth.

14. In railway signaling apparatus, the combination with one or more conductors mounted in suitable proximity to the track, of an instrument mounted on the car or train for transmitting electrical impulses to the said conductors, indicating mechanism located at stations and operated by impulses taken from the said line conductors, the said indicating mechanism including an endless traveling band and pointers carried thereby, a casing located in proximity to the band and having graduated parts utilized by the aid of the pointers to indicate the location or distance of trains from stations.

15. In railway signaling apparatus, the combination with one or more conductors mounted in suitable proximity to the track, of an instrument mounted on the car or train for transmitting electrical impulses to the said conductors, indicating mechanism located at stations and operated by impulses taken from the said line conductors, the said indicating mechanism including an endless traveling band and pointers carried thereby, a casing located in proximity to the band and having separated graduated parts, utilized by the aid of the pointers to indicate the location of trains approaching or leaving the station, a plate movably mounted adjacent the casing and provided with slots so arranged that when actuated in opposite directions the graduated parts of the casing are alternately exposed through the slots, electro-magnetic means automatically controlled from the train for moving the said plate in one direction or the other, the plate being provided with spring-hooks for holding it in the position to which it has been moved by the electro-magnetic means, the said hooks being so located that they are acted on and released by the pointers whereby they are allowed to assume the opposite position.

16. In railway inductive signaling apparatus, the combination of one or more conductors mounted in suitable proximity to the track, an instrument mounted on the train for transmitting electrical impulses to said conductors by induction, and mechanism located at stations, and automatically operated by the inductive impulses of said line conductors, to indicate the location of trains.

17. In railway signaling apparatus, the combination of an instrument mounted on the train for receiving electrical impulses, a circuit in which said instrument is located, means mounted on the train for automatically and intermittently opening and closing said circuit, and means located at a station and automatically operated from said circuit to indicate the location of trains.

In testimony whereof I affix my signature in presence of two witnesses.

EDSON RAY WOLCOTT.

Witnesses:
DENA NELSON,
A. J. O'BRIEN.